E. T. ROSS & F. G. VEATCH.
ANIMAL TRAP.
APPLICATION FILED SEPT. 6, 1910.
995,095.
Patented June 13, 1911.
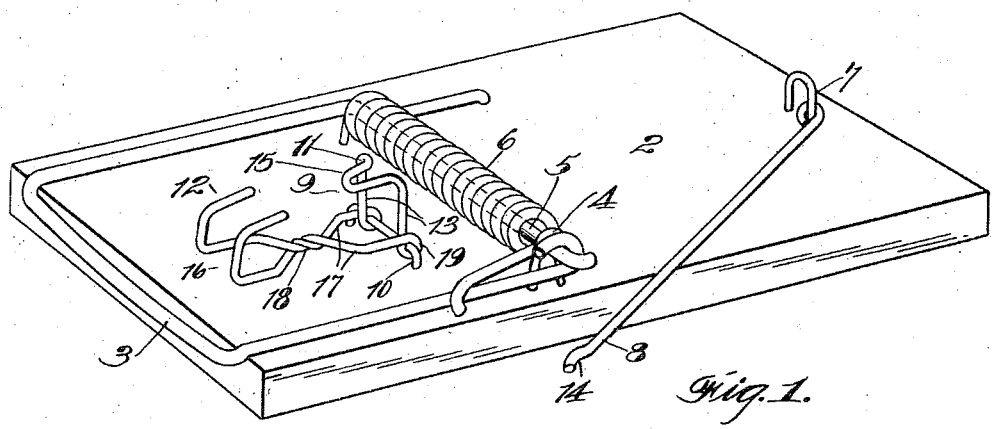
Fig. 1.
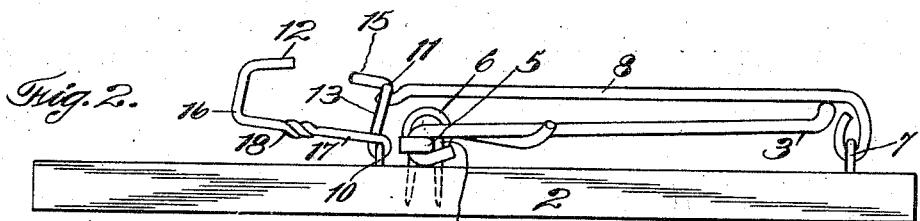
Fig. 2.
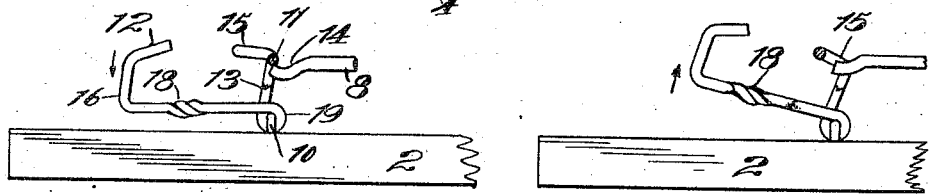
Fig. 3.
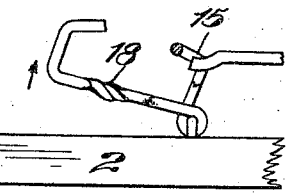
Fig. 4.
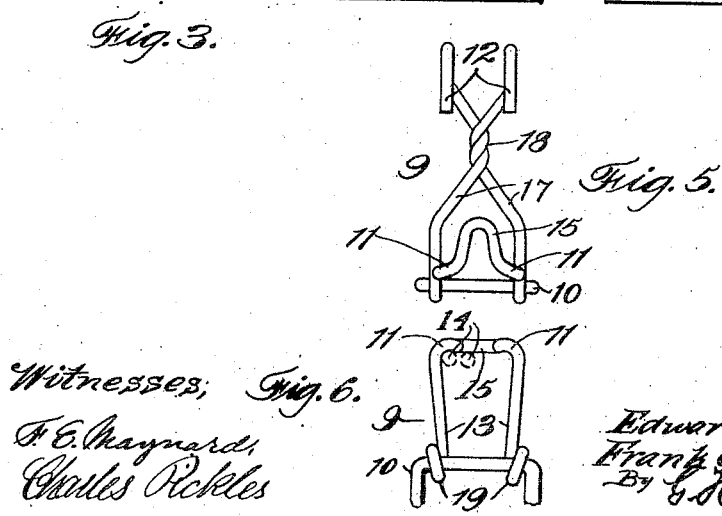
Fig. 5.
Fig. 6.
Witnesses;
F. E. Maynard,
Charles Pickles
Inventors,
Edward T. Ross and
Frank G. Veatch
By G. H. Strong,
his Atty.

UNITED STATES PATENT OFFICE.

EDWARD T. ROSS AND FRANK G. VEATCH, OF SAN FRANCISCO, CALIFORNIA.

ANIMAL-TRAP.

995,095.   Specification of Letters Patent.   Patented June 13, 1911.

Application filed September 6, 1910. Serial No. 580,608.

*To all whom it may concern:*

Be it known that we, EDWARD T. ROSS and FRANK G. VEATCH, citizens of the United States, residing in the city and county of San Francisco and State of California, have invented new and useful Improvements in Animal-Traps, of which the following is a specification.

This invention pertains to animal traps, and is particularly pertinent to spring traps.

The object of this invention is to provide a simple, powerful and inexpensive device for catching animals; to provide especially a trigger device whereby the bait when placed upon the trigger is prevented from being jarred off and is not likely to be dislodged when attacked by animals; and to so design the trigger or bait holding device that much time is saved in baiting the same, and by insuring the proper retention of the bait upon the trigger the frequent loss of bait material is prevented, thus economizing in the use of this material.

It is a particular object of the invention to devise a trigger operated trap in which the trigger is adapted to release the guillotine either when moved upwardly or downwardly by the attacking animal, and which is so designed as to be particularly strong; the whole trap being made to withstand long and constant use.

The invention consists of the parts and the construction and combination of parts as hereinafter more fully described and claimed, having reference to the accompanying drawings, in which—

Figure 1 is a perspective view of the trap. Fig. 2 is a side elevation of the same in the set position. Fig. 3 is a detail side elevation of the trigger shown releasing the guillotine when depressed. Fig. 4 is a similar detail elevation showing the release of the trap by the uplifting of the trigger. Fig. 5 is a plan view of the trigger. Fig. 6 is an end view of the trigger.

It is well known that it is the habit of rats and other animals, when attacking material, to gnaw upwardly, and we have found by actual experience that with the common form of guillotine trap the bait is frequently entirely removed from the bait lever or trigger without releasing the guillotine loop. Investigation shows that the ordinary trap is not designed to be operated by an upward pull on the bait, and is only set off when the bait lever or trigger is depressed.

We have actually constructed and successfully operated a number of traps so designed as to release the guillotine loop either upon depression of the lever or trigger, or upon its being pulled upwardly. To accomplish this desideratum of a double acting trigger and thus effectually increase the adaptability and efficiency of the trap, we have shown mounted upon a suitable base member 2, a loop-shaped guillotine 3, pivoted in suitable bearings 4 by an angularly bent transverse rocker-arm 5 surrounded by a powerful resilient device or spring 6, one arm of which reaches forwardly and over one of the side arms of the guillotine 3; the other arm of the spring passing rearwardly below the transverse rocker-arm 5 of the spring and being secured in the base 2. This construction is such that when the guillotine loop 3 is forcibly turned upwardly and backwardly upon the base plate 2 it places the spring member 6 under tension, which is sufficient to retain an animal between the surface of the plate 2 and the arms of the guillotine 3 when the guillotine is in the released position.

In order to retain the guillotine 3 in its out-turned or set position and under tension of the spring 6, there is pivoted at 7 a loose spring-retaining lever 8 adapted to be passed over the cross bar of the guillotine 3, and downwardly so that its free end occupies a position somewhat above the spring 6. Thus the energy of the spring is effective upon the loose spring-retaining lever 8 close to its fulcrum 7 and exerts an upward thrust on the loose spring-retaining lever.

The loose spring-retaining lever, forming the releasing mechanism for the guillotine 3, is held in its operative position by a peculiar and especially designed trigger 9 pivoted loosely upon a suitable member 10. One of the important features of this trigger resides in so forming its loose spring-retaining lever - holding shoulders 11 that they will release the loose spring-retaining lever when the outer baited end 12 of the trigger is either depressed or elevated relative to its set position when engaging the loose spring-retaining lever 8, which is under pressure of the spring. In order to effect this double releasing property of the trigger 9 it is formed with two parallel upwardly extending bars 13, of sufficient length to insure ample movement downwardly of the outer end of the loose spring-retaining lever toward the spring 6, and the upper ends of the bars 13 are then horizontally or angularly bent toward one another to form slight shoulders 11 adapted to receive the slightly curved end 14 of the loose spring-retaining lever 8. The bars, after being bent sufficiently to form the shoulders 11, are then curved outwardly, as at 15, toward the bait carrying end 16 of the lever; thus in operation when the baited lever is depressed the shoulders will move outwardly off of the end 14 of the loose spring-retaining lever 8, and this being released will allow the expansion of the spring 6, which will rapidly throw over the guillotine 3.

When the baited end 16 of the lever is attacked by an animal and raised, the shoulders 11 of the trigger ride upwardly on the inclined end 14 of the loose spring-retaining lever 8, and this is forced inwardly toward the open looped portion 15 of the trigger, being quickly released by the inclined wedge-like faces, and thus being effective to release the loose spring-retaining lever under the effort of the spring 3.

Referring particularly to Figs. 5 and 6 of the drawings, the trigger is shown as comprising a pair of main lever or body forming arms 17, which may be twisted, as at 18, to reinforce and stiffen the lever, and the outer bait-receiving ends of the arms 17 are suitably bent upwardly and inwardly, forming substantial hooks 12 between which, and the body portion of the lever, the bait may be firmly jammed. It has been found in territories where campaigns have been waged against vermin, such as rats, field mice, gophers and the like, that a vast amount of bait material is wasted by reason of the fact of its becoming loosened and lost from the bait lever, and also a great deal of time is consumed in properly securing the bait to traps of the ordinary structure. In order to obviate these difficulties and economize in the use of the bait material and facilitate the baiting of the trap, we specially form this hook structure on the lever. This structure of trigger insures a substantial, powerful, practically rust-proof trigger and one having no sharp cutting edges or lips to be worn away, and this is particularly important with reference to that part of the trigger which engages the releasing loose spring-retaining lever 8, because in ordinary traps which are provided with sharp metallic edges, it has been found that these sharp edges will eventually wear seats or notches in the releasing loose spring-retaining lever which render the trap inoperative. The trigger is mounted upon its pivotal support 10 by forming suitable eyes 19, which are passed over the staple, and after this has once been firmly driven into the base 2 of the trap it is absolutely impossible for the trigger to become lost from its pivot member.

Having thus described our invention, what we claim and desire to secure by Letters-Patent, is—

1. In a trap, the combination with a spring-actuated loop member, and a retaining lever therefor, of a trigger to engage said lever, said trigger being pivotally mounted having spaced upwardly projecting bars, the upper ends of said bars being angularly bent toward each other to form locking shoulders at the junction of the bent portions and being connected to form a space intermediate of the locking shoulders.

2. In a trap, the combination with a spring-actuated loop member, and a retaining lever therefor, of a trigger to engage said lever, said trigger being pivotally mounted having spaced upwardly projecting bars, the upper ends of said bars being angularly bent toward each other to form locking shoulders at the junction of the bent portions and being connected to form a space intermediate of the locking shoulders, the bent upper ends of the bars converging toward each other to form wedge-like sides to engage the free end of the retaining lever.

In testimony whereof we have hereunto set our hands in the presence of two subscribing witnesses.

EDWARD T. ROSS.
FRANK G. VEATCH.

Witnesses:
CHARLES EDELMAN,
FRANK L. GAYTOR.